US007607218B2

(12) United States Patent

Montena et al.

(10) Patent No.: US 7,607,218 B2

(45) Date of Patent: Oct. 27, 2009

(54) TOOL ADAPTOR

(75) Inventors: Noah Montena, Syracuse, NY (US); Mayue Xie, Syracuse, NY (US)

(73) Assignee: John Mezzalingua Associates, Inc., East Syracuse, NY (US)

(*) Notice: Subject to any disclaimer, the term of this patent is extended or adjusted under 35 U.S.C. 154(b) by 620 days.

(21) Appl. No.: 11/058,332

(22) Filed: Feb. 15, 2005

(65) Prior Publication Data

US 2006/0179647 A1 Aug. 17, 2006

(51) Int. Cl.
*B23P 19/00* (2006.01)

(52) U.S. Cl. ............................ 29/759; 29/751; 29/758; 29/760; 29/764

(58) Field of Classification Search .................. 29/749, 29/750, 758, 759, 760, 745, 755, 757, 575, 29/751; 439/495, 585, 352, 108, 485; 81/355, 81/366, 353; 174/75 C
See application file for complete search history.

(56) References Cited

U.S. PATENT DOCUMENTS

| | | | | | |
|---|---|---|---|---|---|
| 4,005,516 | A | * | 2/1977 | Bakermans | 29/749 |
| 4,174,560 | A | * | 11/1979 | Senior et al. | 29/566.1 |
| 4,386,461 | A | * | 6/1983 | Plummer | 29/749 |
| 5,156,431 | A | * | 10/1992 | Lowe | 294/99.2 |
| 5,402,561 | A | * | 4/1995 | Cerquone et al. | 29/751 |
| 5,596,800 | A | | 1/1997 | Holliday et al. | |
| 5,647,119 | A | * | 7/1997 | Bourbeau et al. | 29/751 |
| 5,671,310 | A | * | 9/1997 | Lin et al. | 385/78 |
| 5,845,393 | A | * | 12/1998 | DePaiva | 29/751 |
| 6,272,738 | B1 | * | 8/2001 | Holliday et al. | 29/751 |
| 6,293,004 | B1 | | 9/2001 | Holliday | |
| 6,415,499 | B1 | | 7/2002 | Holland et al. | |
| 6,536,103 | B1 | | 3/2003 | Holland et al. | |
| 6,551,128 | B2 | * | 4/2003 | Asai | 439/495 |
| 6,671,944 | B2 | | 1/2004 | Holliday et al. | |
| 6,708,396 | B2 | | 3/2004 | Holliday | |

* cited by examiner

*Primary Examiner*—Derris H Banks
*Assistant Examiner*—Tai Nguyen
(74) *Attorney, Agent, or Firm*—Marjama Muldoon Blasiak & Sullivan I

(57) ABSTRACT

A tool adaptor for securing a compression type end connector to the prepared end of a coaxial cable. The adaptor includes two slide members that are mated in an interlocking sliding relationship with the end connector placed in engagement with contoured seats located in each of the slide members. Opposed drive surfaces are located in the slide members that can be engaged between the jaws of a crimping tool to apply an axial force to the end connector so as to radially compress a deformable section of the connector into tight frictional engagement with the coaxial cable.

20 Claims, 13 Drawing Sheets

FIG.2B
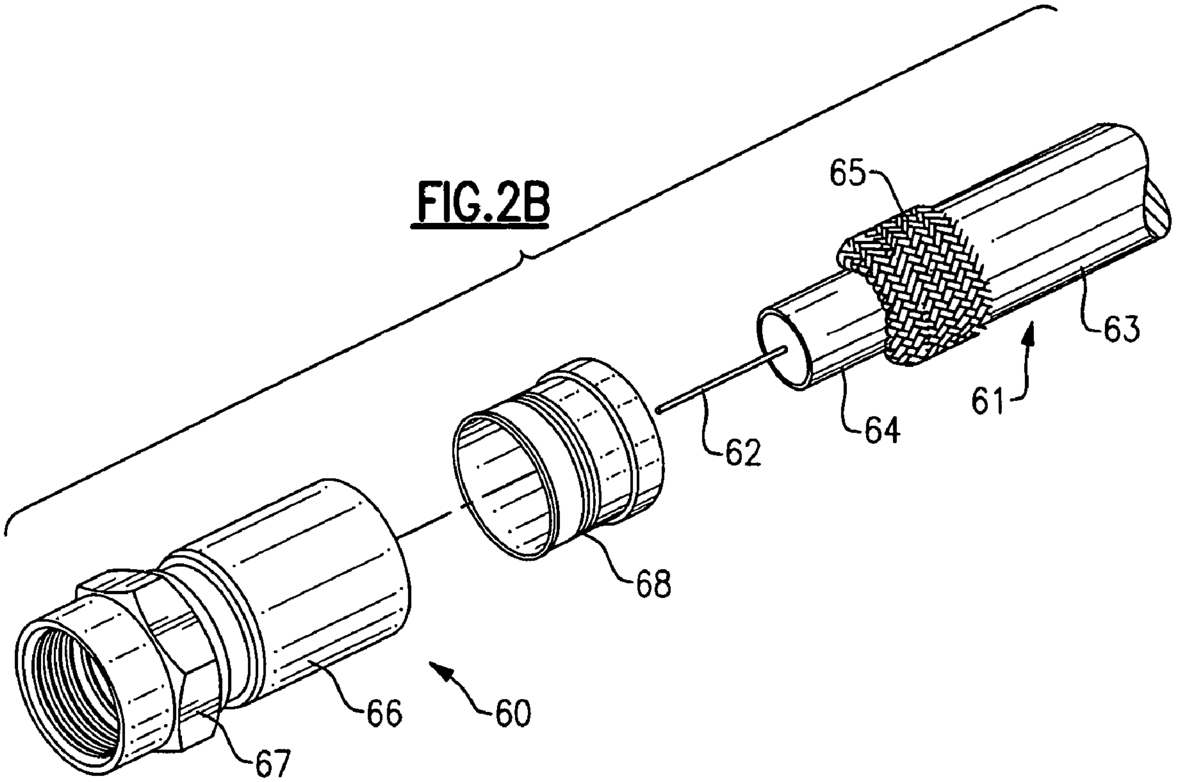
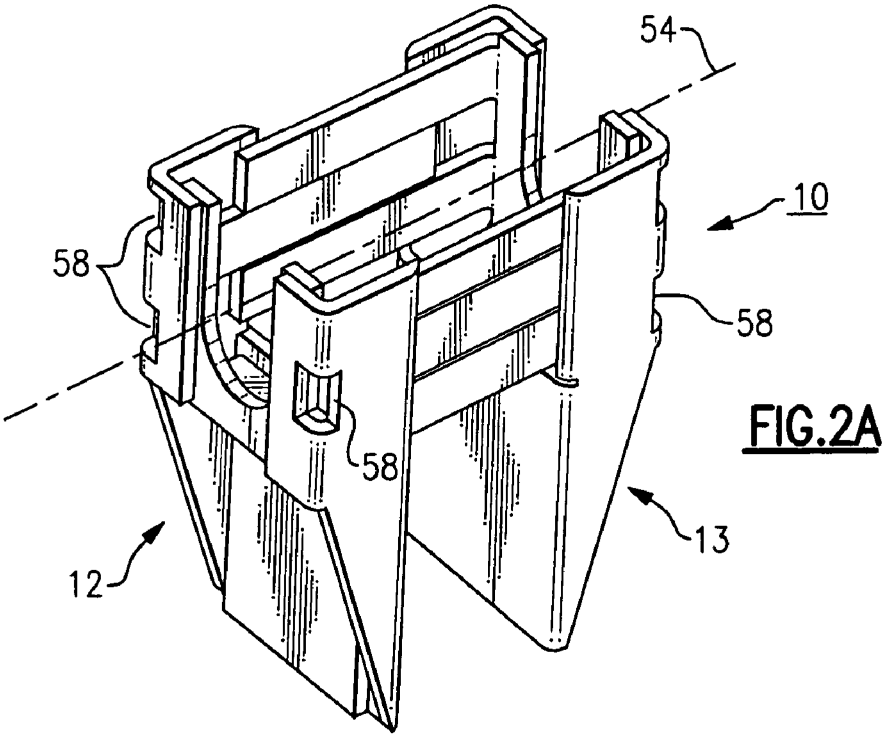
FIG.2A

TOOL ADAPTOR

FIELD OF THE INVENTION

This invention relates to a tool adaptor for securing the prepared end of a coaxial cable to a compression type end connector.

BACKGROUND OF THE INVENTION

A wide variety of compression type end connectors have recently been developed for use in the cable industry. These devices have found wide acceptance because of ease of manufacture and lack of complexity in design and in use. Typically, the compression type connector includes a hollow body and a hollow post mounted within the body which passes through one end wall of the body and a threaded nut that is rotatably mounted on the extended end of the post. A compression member is arranged to move axially into the back end of the body. One end of a coaxial cable is prepared by stripping the back outer portions of the cable to expose the center connector. The connector is then passed through the compression ring into the back end of the body allowing the hollow post to pass between the woven metal mesh layer of the cable and the inner dielectric layer so that the wire mesh layer and outer barrier layer are positioned in the body cavity between the post and the inner wall of the body. Installation of the connector upon the end of the prepared coaxial cable is completed by axial movement of the compression member over an inclined surface to produce a radial deformation of the compression member into tight frictional engagement with the outer surface of the coaxial cable thus securing the connector to the end of the cable.

Although most of the compression type end connectors work well in securing the coaxial cable to the end connector, the installer oftentimes has difficulty in applying a high enough axially directed force to effectively close the connection. A force that is applied off axis will not properly deform the compression member, thus resulting in a less than successful closure between the connector and the cable. Most of the devices used to compress an end connector upon a coaxial cable are relatively large complex devices, and thus unsuited for use by an installer in the field, or an individual working at home or in a small shop.

SUMMARY OF THE INVENTION

It is a primary object of this invention to provide an improved tool adaptor for securing a compression type end connector to a prepared end of a coaxial cable.

It is a further object of the present invention to provide a simple low cost tool adaptor for securing a prepared end of a coaxial cable to a compression type end connector.

It is another object of the present invention to provide a compact tool adaptor for use in the field by an installer for securing the prepared end of a coaxial cable to a compression type end connector.

It is yet another object of the present invention is to provide a compact tool adaptor that enables a compression type end connector to be secured to the prepared end of a coaxial cable using a pair of pliers or any other simple low cost clamping device.

These and other objects of the present invention are attained by a tool adaptor that includes two frames that are mated in an interlocking sliding relationship. Guides are associated with the frames which direct the frames along a common linear path of travel as they move towards or away from each other. Contoured seats are mounted in each frame for engaging spaced apart sections of a compression type end connector for attachment to the prepared end of a coaxial cable. Opposed laterally disposed surfaces are located upon the frames that can be gripped between the co-acting jaws of a tool for applying a linear force to the frames that is sufficient to close the end connector about the coaxial cable.

BRIEF DESCRIPTION OF THE DRAWINGS

For a further understanding of these and objects of the invention, reference will be made to the following detailed description of the invention which is to be read in association with the accompanying drawings, where:

FIG. 2A is a further perspective view of the adaptor shown in FIG. 1 showing the frames in interlocking engagement;

FIG. 2B is an exploded view of a compression type end connector and the prepared end of a coaxial cable prior to mounting in the tool adaptor;

DETAILED DESCRIPTION OF THE INVENTION

Figure 1:
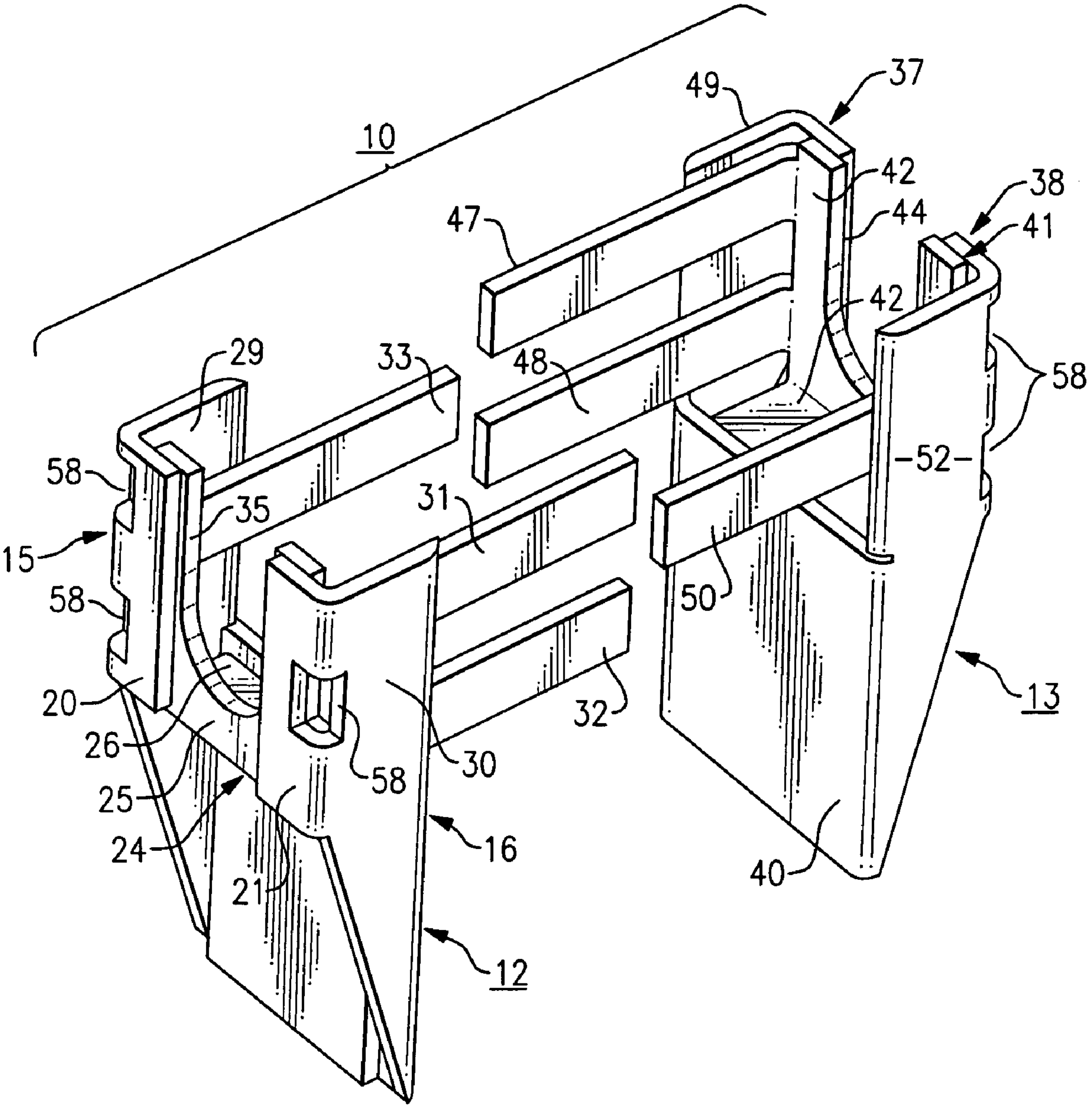
FIG. 1 is an exploded perspective view of a first embodiment of the adaptor in illustrating the two interlocking frames of the tool adaptor being separated.

Turning initially to FIGS. 1-4, there is illustrated a first embodiment of a tool adaptor, generally referenced 10, that contains the teachings of the present invention. The adaptor is made up of a left hand frame 12 and of a right hand frame 13. The left hand frame as viewed in FIG. 1, includes a pair of L-shaped corner members 15 and 16 the lower section of which is integrally joined to a downwardly disposed drive arm 18. The upper section of the frame above the drive arm contains an opening 19 located between the end walls 20 and 21 of the corner members.

An insert generally referenced 24 is contained inside the two corner sections. The insert contains an end wall 25 that fits snugly against the two end walls of the corner members and a bottom wall 26 that extends between the opposed inside surfaces of the side wall 29 and 30 of the corner members. The front edge of the bottom wall rests in contact against the back side of the drive arm 18. The insert is joined to two corner members and the drive arm by spot welds or any other suitable joining techniques.

A pair of parallel rectangular shaped rails 31 and 32 extend outwardly through the open end of the left hand frame 12. The rails are integrally joined to the end wall 25 of the insert 24 and are arranged to rest in contact against side wall 30 of corner member 16. The space separating the two parallel rails is equal to the width of each rail. A single rail 33 is also integral with the end wall of the insert and is arranged to pass out of the open end of the left hand frame. The rail rest in contact against the side wall 29 of corner member 15 and is parallelly aligned with the other two opposing rails.

A U-shaped seat 35 is formed in the end wall 25 of the insert 24 with seat opening through the top edge of the end wall 25.

The right hand frame 13 of the adaptor has a construction that is similar to that of the left hand frame. The frame includes a pair of corner members 37 and 38, the extended lower section of the side walls of which are co-joined by a second drive arm 40. An insert 41 having a bottom wall 42 and an end wall 42 is mounted inside the corner members and a U-shaped seat 44 is formed in the end wall of the insert. A pair of parallel rails 47 and 48 are integrally joined to the end wall 42 of the insert which rest in contact against the side wall 49 of corner member 37. A single rail 50 is also co-joined with the end wall of the insert 41 and rest in contact against the side wall 52 of the opposite corner member 38. The three rails are arranged to extend outwardly through the open upper end section of the right hand frame over the drive arm 40.

As best illustrated in FIG. 2A, the two frame members can be brought together so that the single rail 33 of frame 12 is interlocked between the parallel rails 47 and 48 of the frame 13 while at the same time the single rail 50 of frame 13 is interlocked between the parallel rails 31 and 32 of the frame 12. A close sliding fit is provided between the interlocking rails. The rails are arranged so that the frames are guided along a linear path of travel that is parallel with the center axis 54 of the two U-shaped seats 35 and 44.

With further reference to FIG. 2B, there is illustrated a compression type end connector generally reference 60 and a coaxial cable 61 having an end that has been prepared to accept the end connector. A portion of the cable has been removed at the end of the cable to expose a length of the center conductor 62. In addition, a portion of the outer barrier 63 of the cable has been removed to expose a length of the inner dielectric layer 64 and the woven wire mesh 65 which is located between the inner dielectric layer and the out barrier is rolled back over the barrier layer.

The connector in this case including a non-deformable main body section 66 having a hollow post contained therein and a threaded nut 67 that is rotatably secured to one end of the post. A deformable or collapsible member 68 is inserted into the back of the non-deform able body section and the prepared end of the cable is passed into the connector through the collapsible member so that the hollow post passes between the woven mesh and the inner dielectric layer. As is well known in the art, applying an axially directed force upon the connector produces radial deformation of the compression member resulting in the cable being secured in frictional locking engagement to the end connector.

Although a specific connector is illustrated in FIG. 2B, it should be clear from the disclosure below that the present tool adaptor has the flexibility to accommodate most compression type end connectors that are in present day use.

Figure 3:
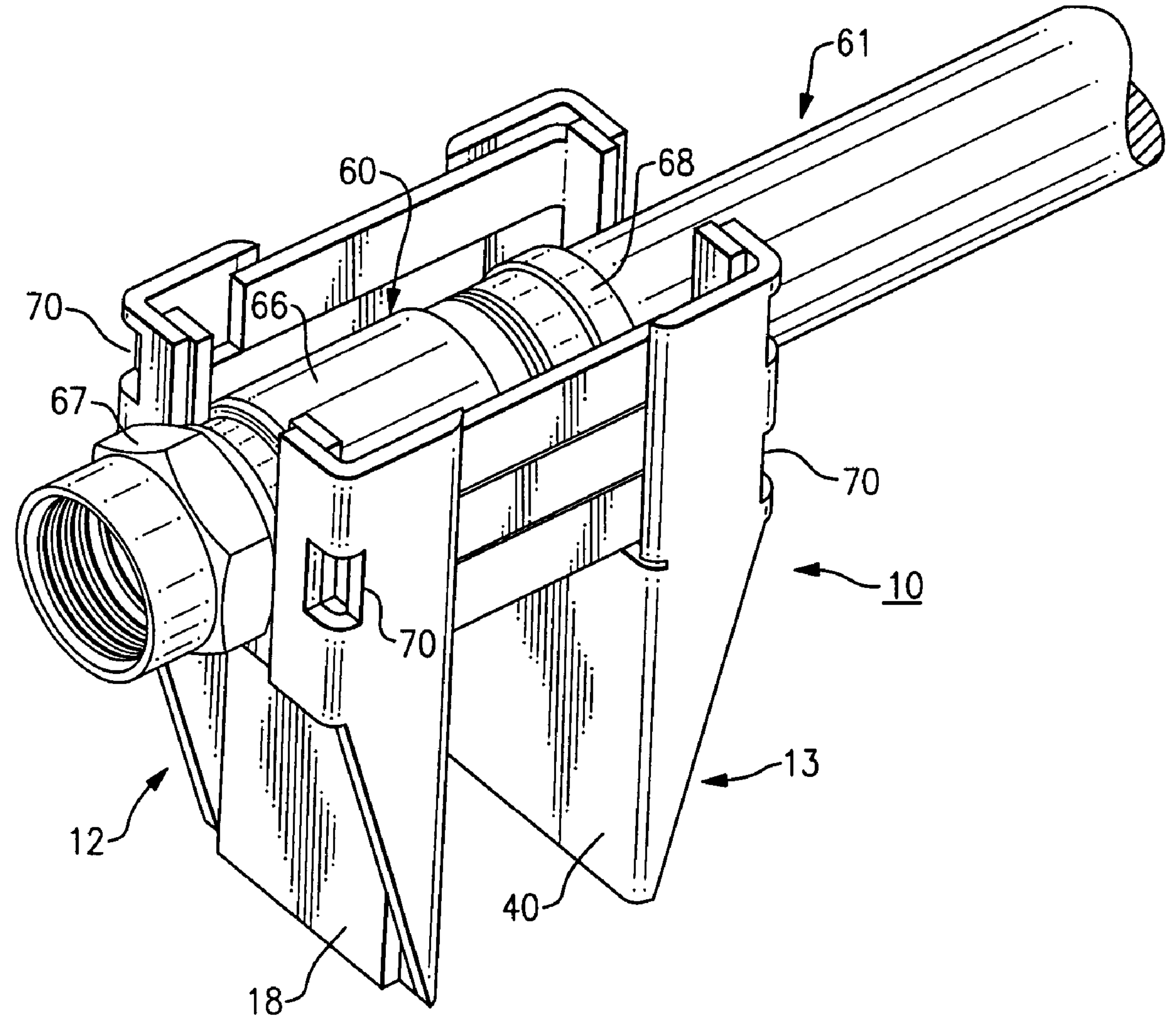
FIG. 3 is a perspective view illustrating the connector mounted in the tool adaptor.

Turning now to FIG. 3, the end connector 60 is shown mounted within the tool adaptor. To receive the end connector, the frames 12 and 13 are initially separated a distance so that the connector can be passed into the seats through its open top of the adaptor. The section of the connector between the threaded nut 67 and the body 66 is mounted in the seat 35 of frame 12 thus restricting the amount of axial movement afforded the connector. The frames are moved away from each other a sufficient distance so that the entire non-deformable connector body and the deformable compression member 68 are located to the inside of the opposing seats. The frames are then brought together so that the seats are in contact with the deformable and non-deformable sections of the end connector.

Figure 4:
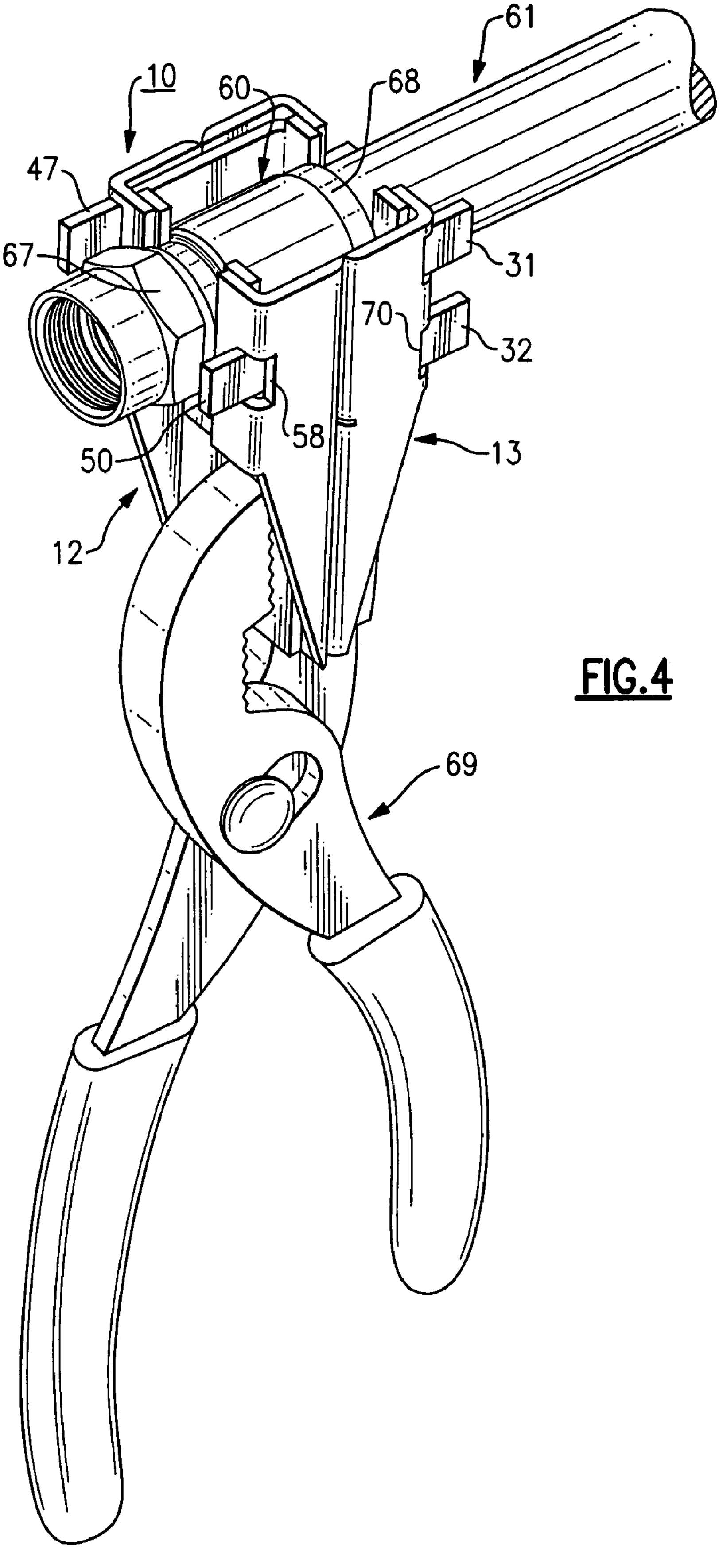
FIG. 4 is a perspective view illustrating the tool adaptor being engaged by a tool for applying an axially directed force to the connector mounted in the adaptor.
Figure 5:
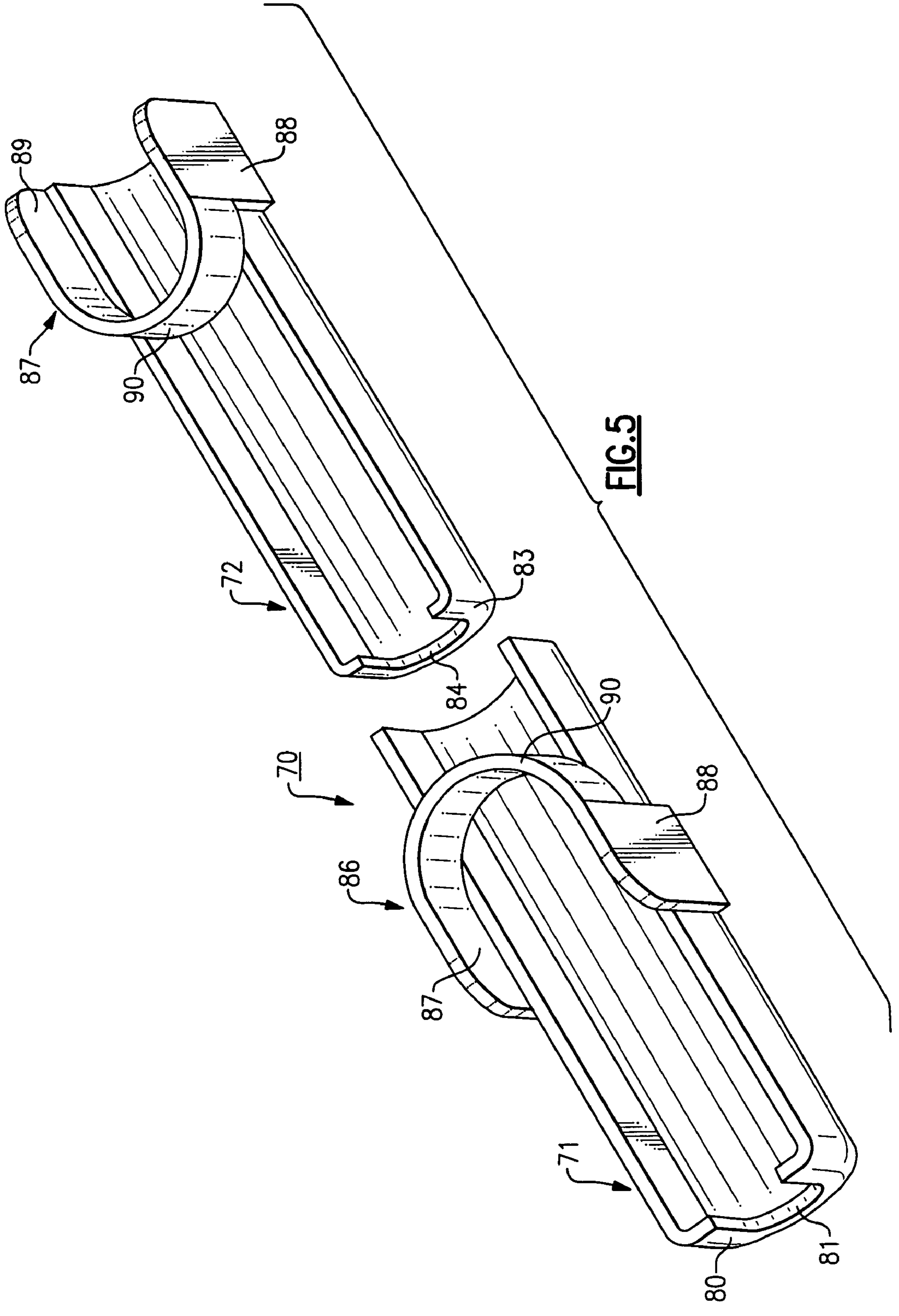
FIG. 5 is an exploded view in perspective illustrating a second embodiment of the present invention with the frames of the adaptor being separated.

As illustrated in FIG. 4, the drive arms 18 and 40 of the two frames are now placed within the jaws of a tool such as a pair of pliers 69 which are capable of driving the frames toward one another along the axis 54 of the end connector to apply a sufficient axial load upon the compression member to radially deform the member and thus secure the connector to the cable. Although the use of pliers is illustrated in FIG. 4, it should be understood by one skilled in the art that other suitable tools such as clamps, vice grips, and the like may be used in the practice of the invention without departing from the teachings of the invention. As illustrated in FIG. 4, cutouts 58-58 are provided in the corner members through which the rails of the frame can pass as the frames are brought together thus providing additional rigidity to the overall structure of the adaptor. Here again, a close sliding fit is provided between the rails and the cutout openings to further insure that the frames move along the desired path of movement to effectively deform the compression member without skewing.

FIGS. 5-9 depict a second embodiment of the invention that is generally referenced 70. This embodiment includes two U-shaped slide members 71 and 72 wherein the inside contour of member 71 compliments the outside contour of member 72. As illustrated in FIG. 6A, member 71 in assembly, is slidably received within member 71. The two side walls 74 and 75 of slide member 72 as well as the arcuate-shaped bottom wall 76 fit snugly within the side walls 77 and 78 and bottom wall 79 of member 71 to establish a close sliding fit between the two members. When slidably contained within member 71, the top edges of the side wall of member 72 are flush with the top edges of member 71.

Figures 6A, 6B:
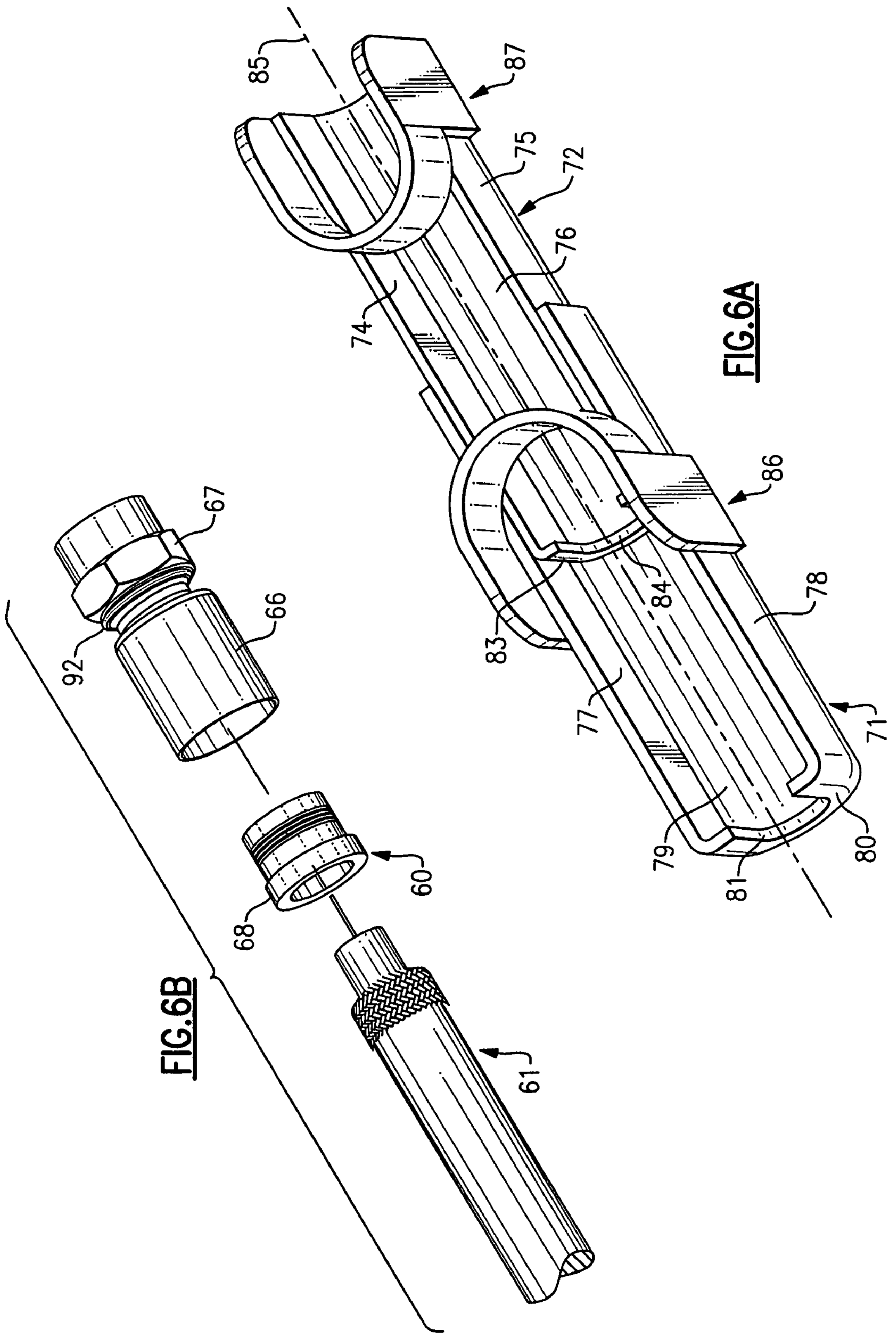
FIG. 6A is a further perspective view of the tool adaptor shown in FIG. 5 with the mating parts being interlocked one inside the other.
FIG. 6B illustrates a compression type connector and the prepared end of a coaxial cable prior to being mounted in the adaptor.

Member 71 includes an end wall 80 that contains a saddle shaped seat 81. Member 72 has a similar end wall 83 which contains a second saddle shaped seat 84. In assembly as illustrated in FIG. 6A, the contour of the two seats are aligned along the central axis 85 of the adaptor. A pair of drive members 86 and 87 are secured to the outer side wall surfaces of the slide members 71 and 72, respectfully. Each drive member includes a pair of raised arms 88 and 89 that support a bridge 90 that spans across the open top of each slide member. In assembly, the bottom wall of each bridge rides in sliding contact against the top edges of the opposing member side-walls, which insures the two members move along a linear path of travel that is parallel to the central axis of the adaptor.

Figure 7:
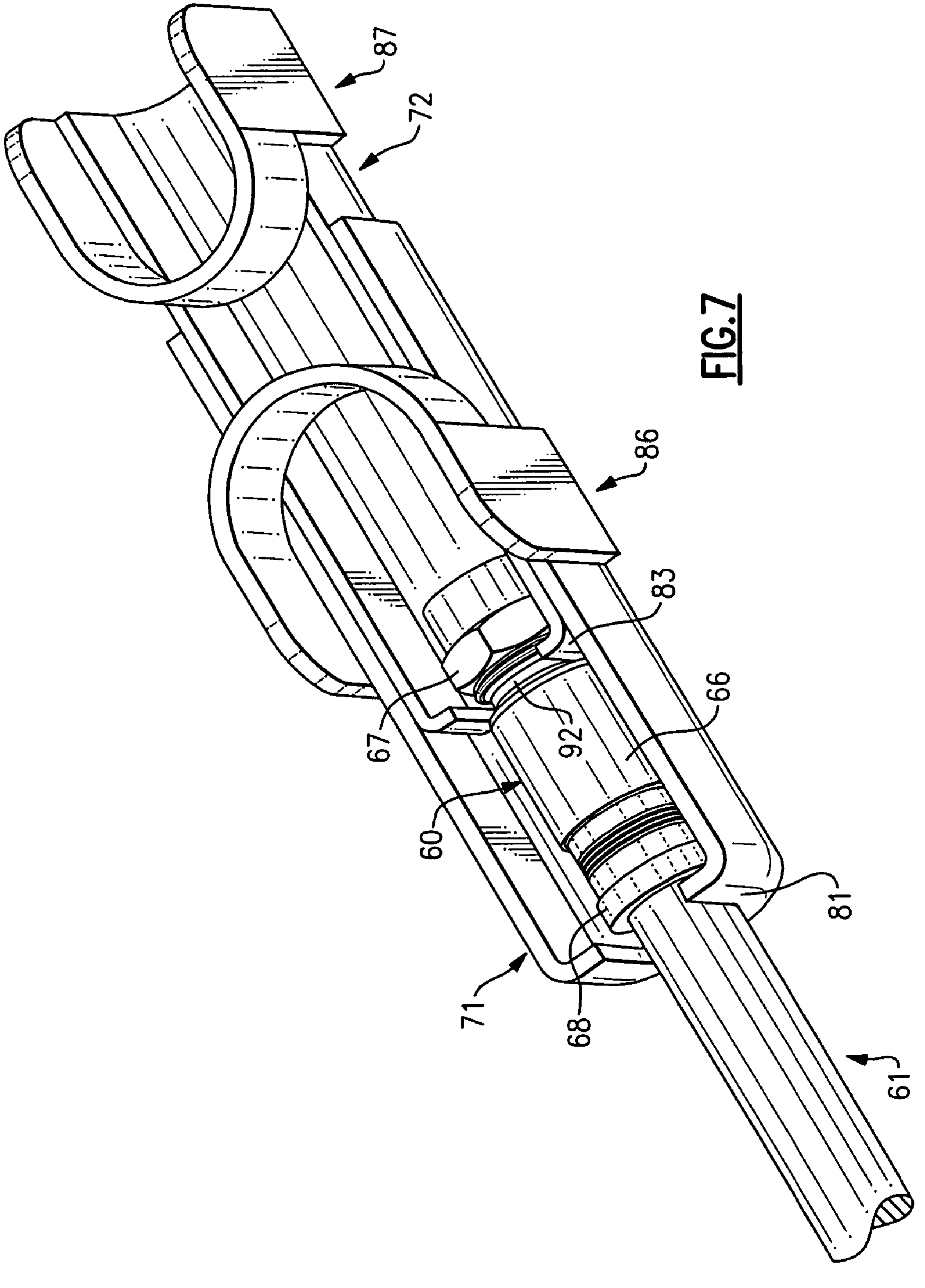
FIG. 7 is a perspective view showing one method of mounting a compression type connector in the tool adaptor.
Figure 8:
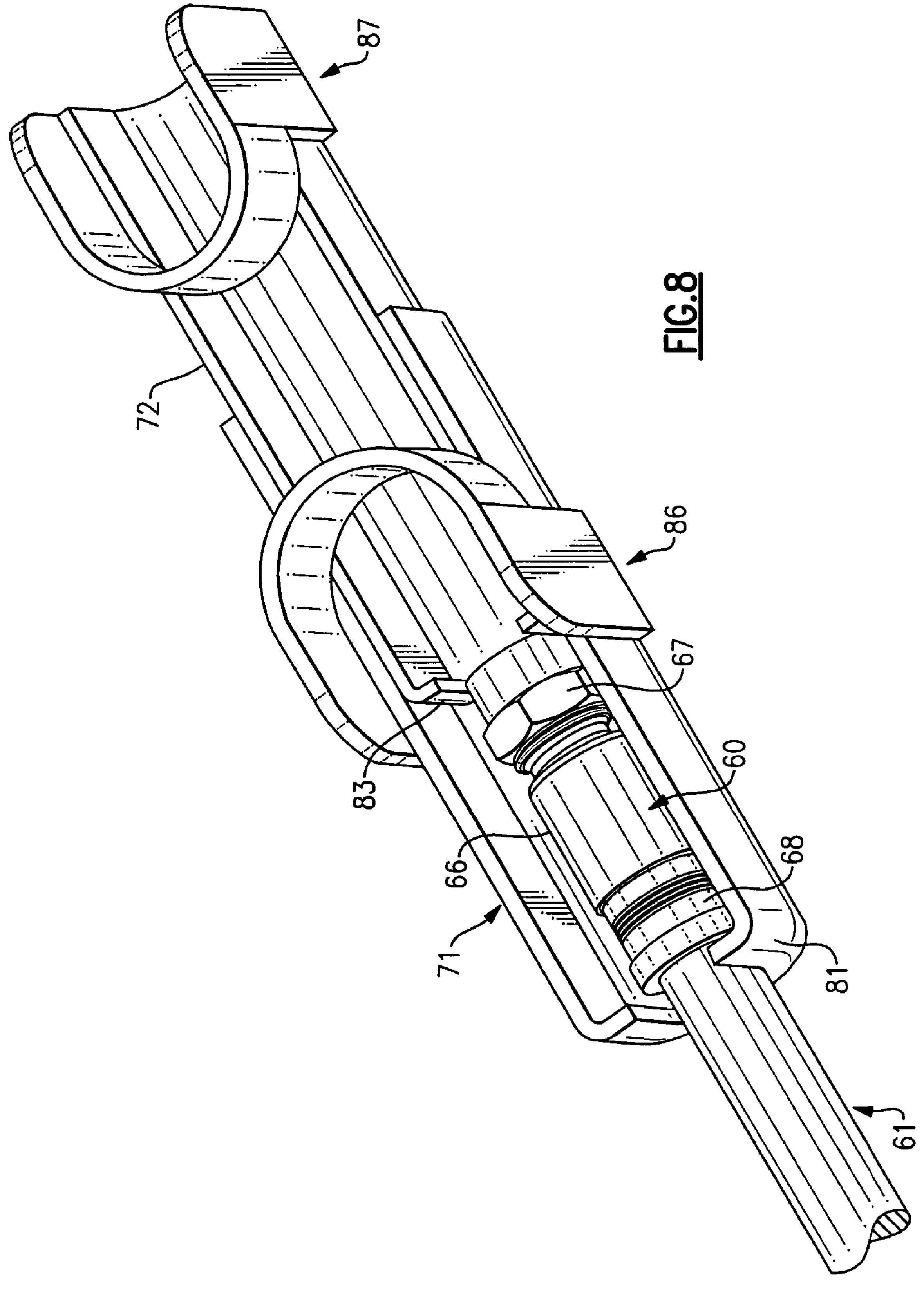
FIG. 8 is a perspective view similar to that shown in FIG. 7 illustrating a second method of mounting a compression type connector in the tool adaptor.

The saddled-shaped seats are arranged to accept a compression type end connector 60 as described above in regard to FIG. 2B. In one application, the end connector is loaded into the tool adaptor 70 as illustrated in FIG. 7 wherein the deformable section 68 of the end connector lies inside the end wall 81 of slide member 71 and the non-deformable section 66 of the end connector is located between the threaded end nut 67 and the body 66 of the connector rests upon the saddle shaped 84 of slide member 72. In another application, the connector may also be loaded into the adaptor as illustrated in FIG. 8 wherein the nut end 67 of the connector lies inside of the end wall 85 of slide member 72.

Figure 9:
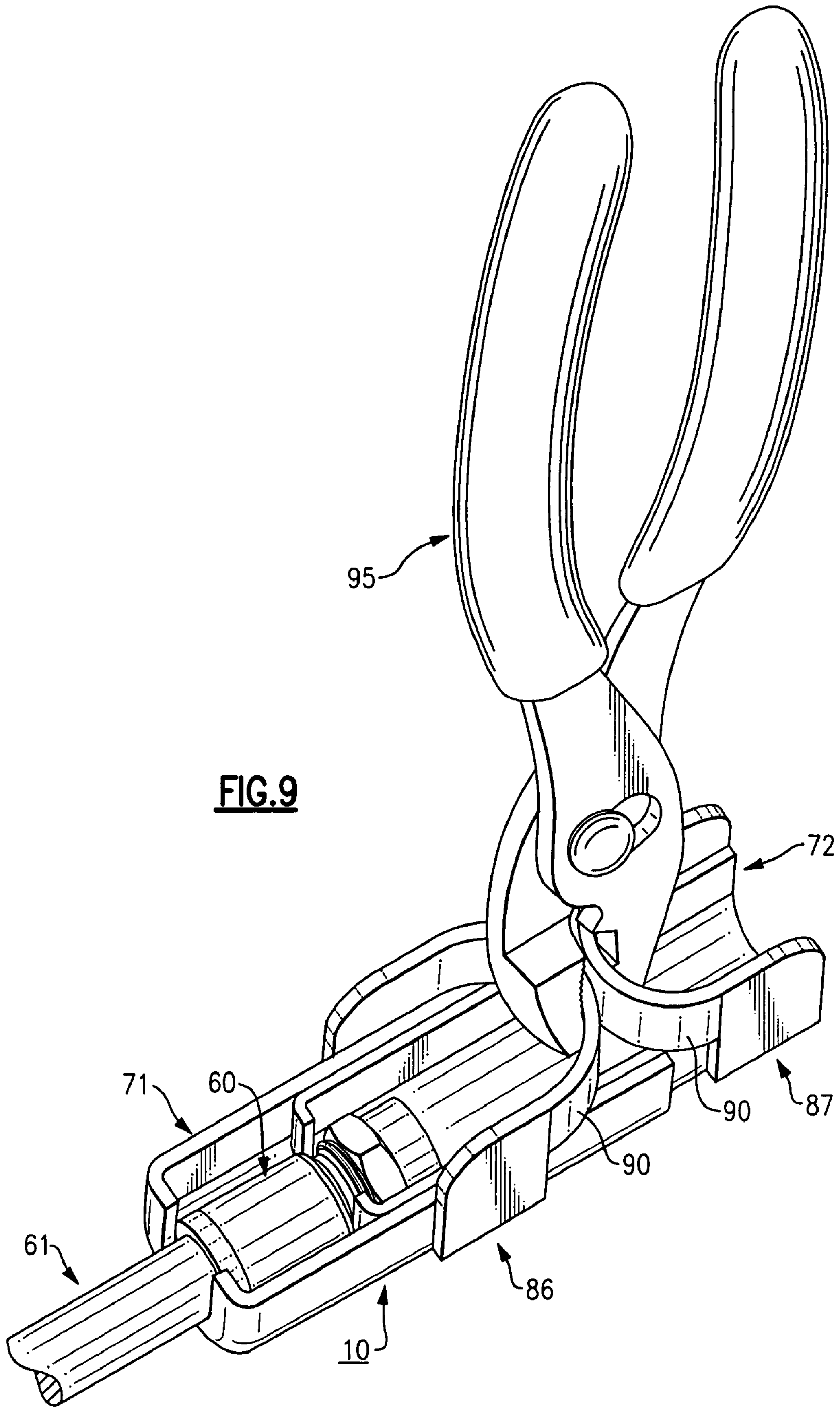
FIG. 9 is a perspective view showing the tool adaptor illustrated in FIG. 7 being engaged by a tool for applying an axially directed to a connector mounted that is in the adaptor.

With the end connector load into the adaptor, the slide members are brought together so that the connector fits snugly between the two end walls of the slide members. As illustrated in FIG. 9, the drive members 86 and 87 are then engaged between the jaws of a pair of pliers 95 and a sufficient axially directed force is applied to the slide members to compress the compression ring and thus close the end connector about the prepared end of the coaxial cable. Here again, a pair of pliers may be used to apply an axial force to the two slide members, any other suitable device such as vice grips, clamps, and the like may be similarly employed without departing from the teachings of the present invention.

Figure 10:
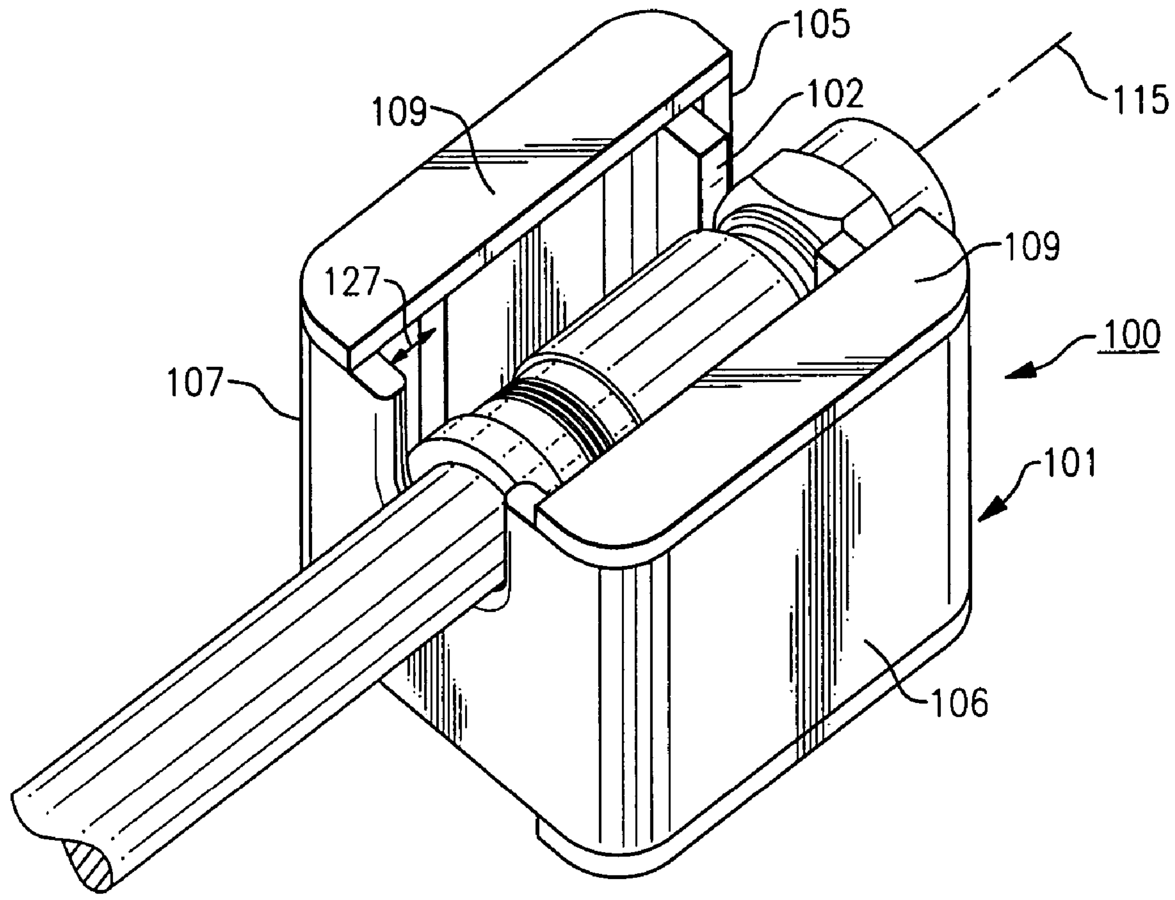
FIG. 10 is a perspective view illustrating a further embodiment of the invention with an end connector mounted therein.
Figure 11:
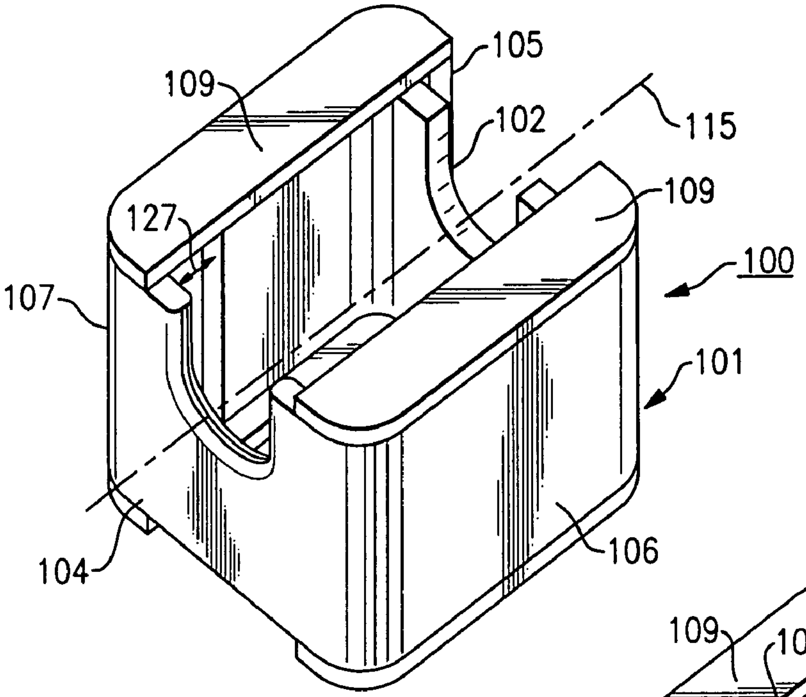
FIG. 11 is a perspective view of the adaptor illustrated in FIG. 10 with the end connector removed.
Figure 12:
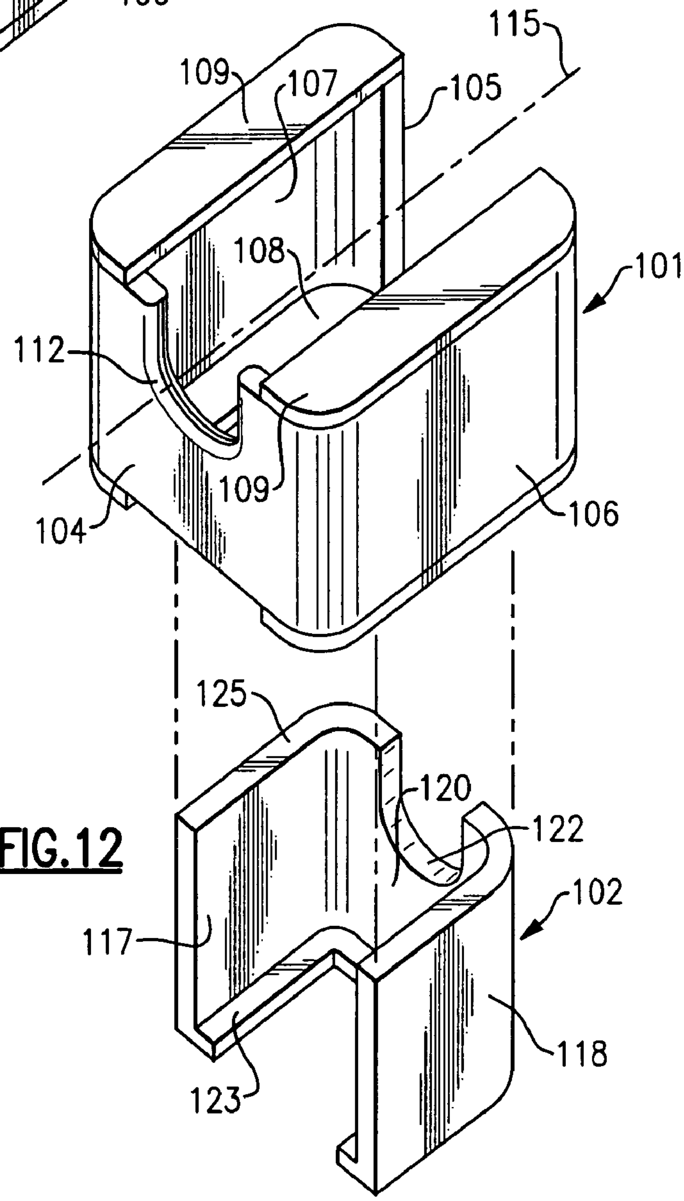
FIG. 12 is an exploded view in perspective showing the two sections of the adaptor.

Turning now to FIGS. 10-12, there is illustrated a further embodiment of the invention that includes a box-like tool adaptor 100. The adaptor contains an outer frame 101 which encloses an inner frame 102. The outer frame includes a pair of opposed end walls 104 and 105 that are cojoined by opposed side walls 106 and 107. A bifurcated bottom wall 108 and a bifurcated top wall 109 enclose the outer frame structure. A wide slot 111 passes through the bottom wall, top wall 109, and end wall 105 of the outer frame with the slot being centered upon the central axis 115 of the adaptor. The purpose of the slot will be explained in greater detail below.

The front end wall of the outer frame contains a contoured seat 112 for the end connector which opens upwardly through the top edge of end wall 104. The width of the seat is less than that of the slot 111.

The inner frame 102 of the adaptor is slidably enclosed within the outer frame. The inner frame is a three-sided structure having opposed side walls 117 and 118 that are cojoined by an end wall 120.

The end wall 120 contains a second contoured seat 122 that opens upwardly through the top edge of the end wall. Here again, the seat width is less than that of the slot in the outer frame. In assembly, the seat 122 is centrally aligned with the seat 112 of the outer frame along the axis 115 of the adaptor.

As illustrated in FIGS. 11 and 12, the inner frame section contains an inwardly turned rib 123 that extends around the lower edge of the frame structure. The rib is adapted to ride in sliding contact with the bifurcated bottom wall 108 of the outer frame. The side walls and the end wall of the inner frame extend upwardly and are arranged to ride in sliding contact with the bifurcated top wall of the outer frame. The two side walls of the inner frame are also arranged to ride in close sliding contact with the opposed side walls of the outer frame.

When the end wall 120 of the inner frame is registered against the end wall 105 of the outer frame, a space 124 (FIG. 10) is provided between the inner frame and the opposing end wall 104 of the outer frame to allow the inner frame to move axially within the inner frame. An end connector of the type described above can be inserted onto the seats and the seats moved axially into operable engagement with the deformable and non-deformable sections of the end connector. The outer surfaces of end walls 120 and 104 of the frames are perpendicular to the axis of the adaptor and are engagable by the jaws of a crimping tool (not shown) which applies a sufficient axial force to compress the deformable section of the connector into locking contact with the prepared end of the coaxial cable.

In assembly, the inner frame of the adaptor is inserted inwardly into the outer frame through the bottom of the outer frame prior to the bifurcated section 108 of the outer frame being welded in place to close the assembly.

Figure 13:
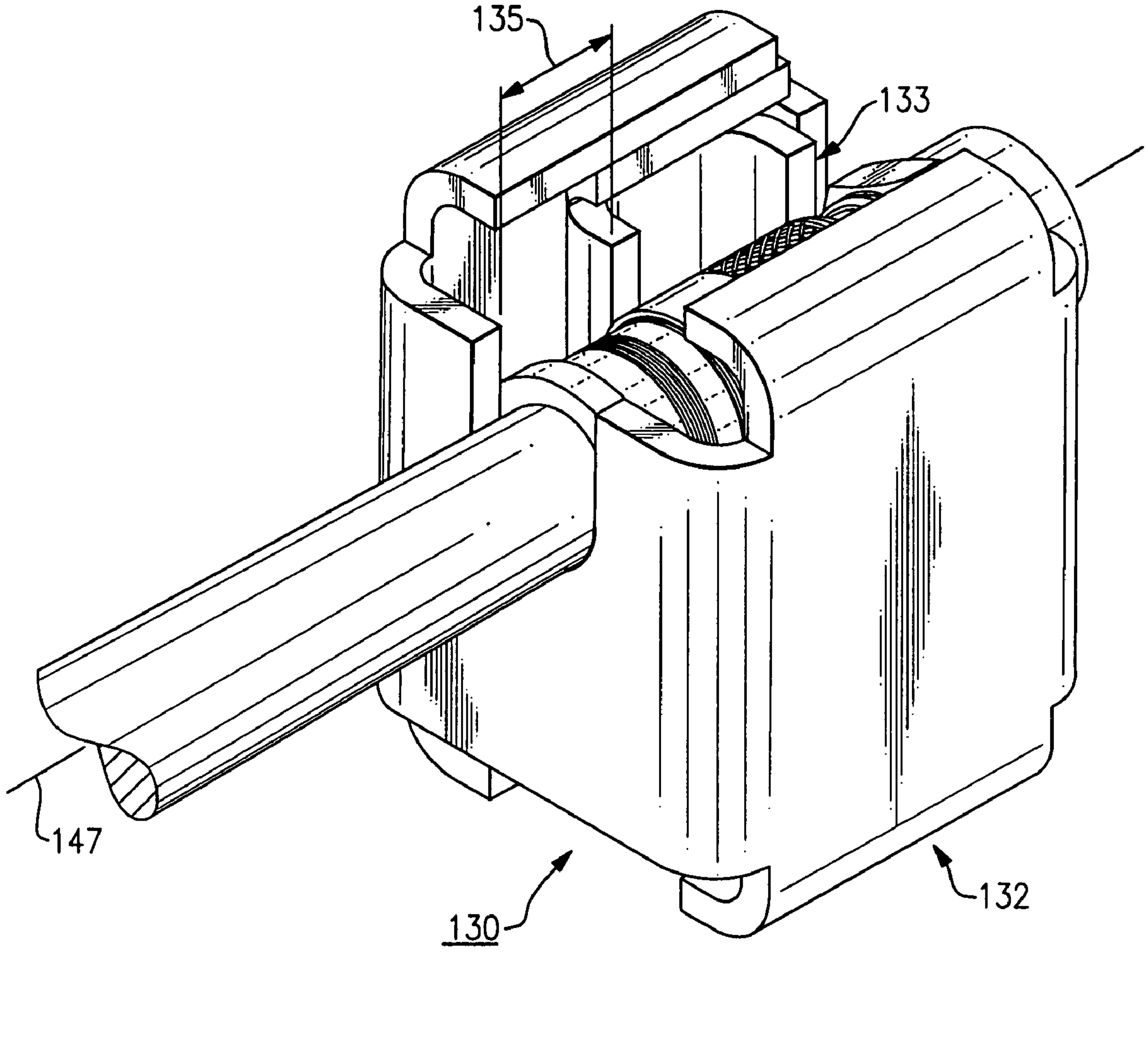
FIG. 13 illustrates a further embodiment of the invention similar to that illustrated in FIG. 10 showing an end connector mounted therein.
Figure 14:
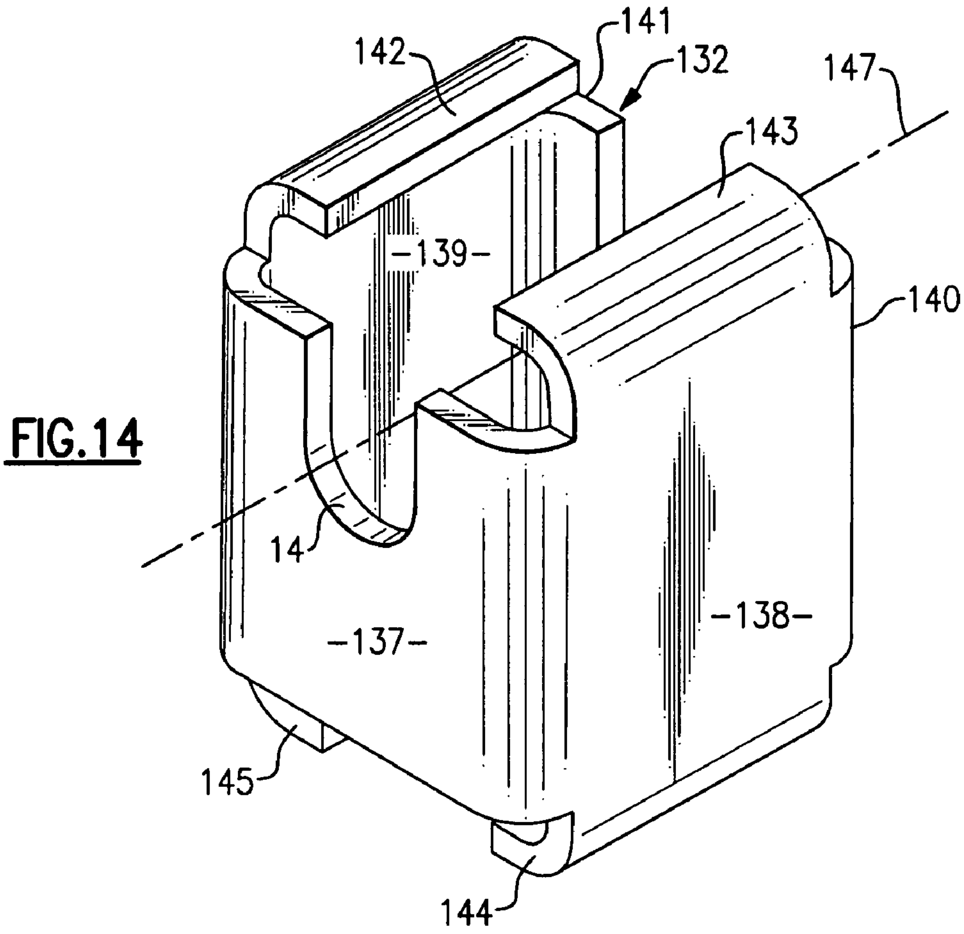
FIG. 14 is a perspective view of the outer frame of the adaptor shown in FIG. 13.
Figure 15:
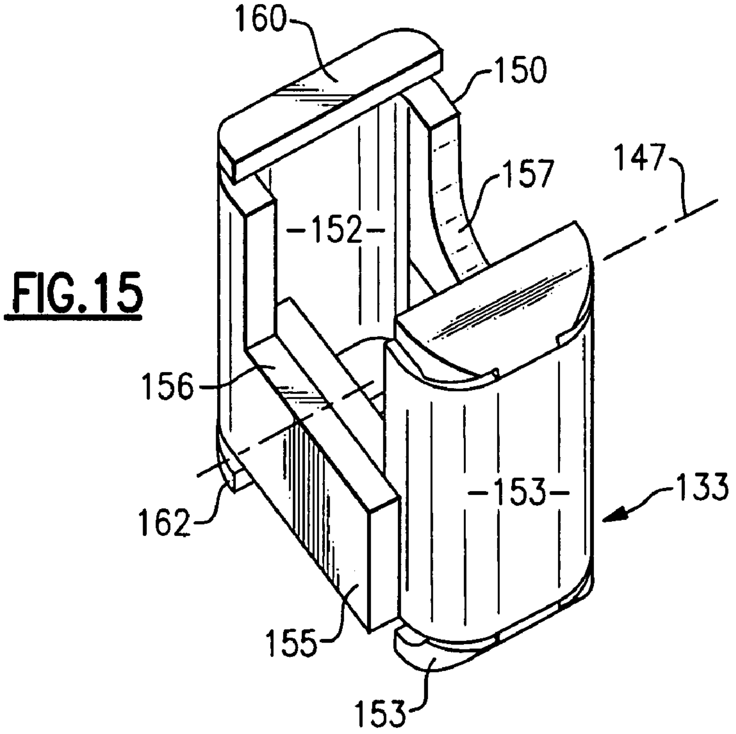
FIG. 15 is a perspective view of the inner frame of the adaptor shown in FIG. 13.

Turning now to FIGS. 13-15, there is illustrated a still further embodiment of the invention which is similar to that illustrated in FIGS. 10-12. The tool adaptor generally referenced 130 again includes an outer frame 132 and an inner frame 133 that is slidably contained within the outer frame. The axial length of the inner frame is less than the inner length of the outer frame to allow a predetermined amount of axial movement 135 for the inner frame in assembly. The inner and outer frames of the adaptor are each fabricated from a single piece of sheet metal that has been bent into a desired shape.

With reference to FIG. 14, the front wall 137 of the outer frame is bent to establish two perpendicular side walls 138 and 139. The back ends of the two side walls are again bent to form the two sections 140 and 141 of a bifurcated back wall that is parallel with the front wall. The top and bottom edges of the side walls extend outwardly from the side wall above and below the top and bottom edges of the front and back wall of the frame. The extended edges of the side walls are again bent inwardly to create two sections 142 and 143 of a bifurcated top wall and two sections 144 and 145 of a bifurcated bottom wall. A seat 145 which is narrower than the bifurcations in the top, bottom, and end walls of the outer frame is passed downwardly through the top edges of the front wall. The bifurcations and the seat are all centered about the central axis 147 of the adaptor.

As illustrated in FIG. 15, the inner frame 133 of the adaptor is also fabricated from a single piece of sheet metal. The back wall 150 of the inner frame is bent at both ends to establish a pair of perpendicular side walls 152 and 153. The front section of each side wall is again bent inwardly so that the two bent sections are superimposed to establish the front wall 155 of the frame. The two sections forming the front wall are cut back vertically through the top edge of the wall to create a shelf 156. A second seat 157 is passed downwardly through the top edge of the back wall of the inner frame. As in the case of the outer frame, the top and bottom sections of the two side walls extend outwardly from the walls and are bent inwardly to form the two sections 160 and 161 of a bifurcated top wall and the two sections 162 and 163 of a bifurcated bottom wall.

In assembly, the inner frame is passed into the outer frame through either the top or bottom section of the outer frame before the wall is closed. Here again, the inner frame is supported in close sliding contact with the inner walls of the outer frame with the seats of the adaptor being coaxially aligned along the central axis of the adaptor. With an end connector mounted in the seats as illustrated in FIG. 13, the front wall of the outer frame and the back wall of the inner frame can be engaged between the jaws of a crimping tool, such as a pair of pliers, and sufficient linear force brought to bear against the end connector to secure it to the prepared end of a coaxial cable.

While the present invention has been particularly shown and described with reference to the preferred mode as illustrated in the drawings, it will be understood by one skilled in the art that various changes in its details may be effected therein without departing from the spirit and scope of the invention as defined by the claims.

What is claimed is:

1. A tool adaptor for applying an axially disposed force to a compression type end connector having a longitudinal axis along the length of a connector body for compressing a deformable section of the end connector into tight frictional engagement with the prepared end of a coaxial cable, wherein said tool adaptor further includes:

a first slide frame and a second slide frame being arranged to move along a linear path of travel toward and away from each other;

a first seat mounted in said first slide frame for engaging a non-deformable section of said end connector and a second seat mounted in said second slide frame for engaging the deformable section of said end connector; and a first drive surface located upon said first slide frame and a second drive surface located upon said second slide frame, said drive surfaces being generally perpendicularly aligned with said longitudinal axis whereby said surfaces can be engaged by the jaws of a clamping tool for applying sufficient linear force along the longitudinal axis of the end connector to compress the deformable section of the end connector into locking engagement with the prepared end of the coaxial cable.

2. The tool adaptor of claim 1, that further includes guide means for guiding the two slide frames along said linear path of travel.

3. The tool adaptor of claim 2, wherein said drive surfaces are located on opposed plates that depend from each of said slide frames.

4. The tool adaptor of claim 2, wherein said guide means includes a series of rails that are mounted upon each of the slide frames, said rails being arranged to interlock in a close sliding relation as the slide frames are moved toward or away from each other along said linear path of travel.

5. The tool adaptor of claim 1, wherein each seat includes a contoured section for engaging a section of an end connector.

6. A tool adaptor for applying an axial disposed force to a compression type end connector, said end connector having a deformable section that is capable of being radially compressed into tight frictional engagement with the prepared end of a coaxial cable when an axial force is applied to said connector, said adaptor including:

a pair of slide frames, each frame containing a pair of L-shaped corner pieces having an end wall and a side wall with a space provided between the end walls of each pair;

a plate connecting the end walls of each corner pair and a contoured seat passing downwardly into each plate through the top edge of each plate so the deformable section of an end connector can be engaged by a first seat and a non-deformable section of said end connector is engageable by a second seat, said seats being coaxially aligned along a common axis;

guide rails attached to each side wall of the two corner pieces that are parallelly aligned with said common axis, said guide rails extending outwardly from one open end of said slide frame with the guide rails of one slide frame slideable engaging the guide rails of the other slide frame; and each slide member containing a flat drive surface that is generally perpendicular to said common axis whereby the jaws of a clamping tool can engage the drive surfaces to move the slide members toward one another.

7. The tool adaptor of claim 6, wherein the guide rails of each slide frame are arranged to ride in sliding contact with a side wall of the other slide frame.

8. The tool adaptor of claim 7, wherein the end walls of each slide frame contain cutouts to permit the guide rails of the other slide frame to pass through the end walls of the other slide frame.

9. The tool adaptor of claim 6, wherein a close sliding fit is provided between the guide rails of one slide frame and the guide rails of the other slide frame.

10. The tool adaptor of claim 9, wherein a close sliding fit is provided between the guide rails of one slide frame and the cutout of the other slide frame.

11. A tool adaptor for applying an axially disposed force to a compression type end connector having a longitudinal axis along the length of a connector body and a deformable section that is able to be radially compressed into tight frictional engagement with a prepared end of a coaxial cable when an axially directed force is applied to the connector, wherein said tool adaptor includes:

a pair of open topped slide members each having a bottom wall and two side walls, one of said slide members being slidably contained within the other slide member to provide a close sliding fit between the walls of the two members so that said slide members can move reciprocally along a common axis;

a first slide member containing a first seat for engaging a first deformable section of a compression type end connector and a second slide member containing a second seat for engaging a second non-deformable section of said end connector; and a drive surface located upon each of the slide members that span across the side walls of each slide member so that said drive surfaces are engagable by the jaws of a clamping tool for transmitting a force along the longitudinal axis of the compression type end connector that is mounted in said seats.

12. The tool adaptor of claim 11, wherein the bottom wall of each slide member is arcuate-shaped.

13. The tool adaptor of claim 11, wherein said drive surfaces are generally perpendicular to said common axis.

14. The tool adaptor of claim 11, wherein the walls of one slide member are in close sliding relation with the walls of the outer slide member.

15. The tool adaptor of claim 11, wherein said first seat is located in an end wall of the first slide member and second seat is located in an end wall of said second slide member.

16. A tool adaptor for applying an axially disposed force to a compression type end connector having a deformable section to compress the deformable section into tight frictional engagement with the prepared end of a coaxial cable, wherein said tool adaptor includes:

a first outer frame having side walls, end walls, a top wall, and a bottom wall, said top wall, said bottom wall, and one end wall of said outer frame being bifurcated to provide a wide slot that passes through said top, bottom, and one end wall;

an inner frame enclosed within said outer frame in axial alignment with the outer frame, said inner frame having two side walls that are joined by an end wall, said side walls of the inner frame being arranged to ride in sliding contact with side walls of the outer frame, the overall axial length of the inner frame being less than the inside axial length of the outer frame whereby the inner frame can move from a first position and a second position inside said outer frame; and a first contoured seat in the end wall of the inner frame for engaging one section of the end connector and a second contoured seat for engaging the other section of the end connector whereby the deformable section of the end connector is compressed into locking engagement with the prepared end of a coaxial cable when the inner frame is moved from said first position towards said second position.

17. The tool adaptor of claim 16, wherein the contoured seats open inwardly through the top edges of the end walls containing the seats and said seats being aligned along the central axis of the adaptor.

18. The tool adaptor of claim 17, wherein the end wall of the inner frame and the opposing end wall of the outer frame each contain outer surfaces that are generally perpendicular to said central axis.

19. The tool adaptor of claim 18, wherein the outer frame of the tool adaptor is integrally formed from a single piece of sheet metal.

20. The tool adaptor of claim 19, wherein said inner frame is integrally formed from a single piece of sheet metal.

* * * * *